Aug. 16, 1938.                R. K. HASKELL                2,126,772
                               TRANSMISSION
                            Filed June 24, 1936         3 Sheets-Sheet 1

Inventor
Robert K. Haskell
By W. N. Roach
Attorney

Aug. 16, 1938.  R. K. HASKELL  2,126,772
TRANSMISSION
Filed June 24, 1936  3 Sheets-Sheet 2
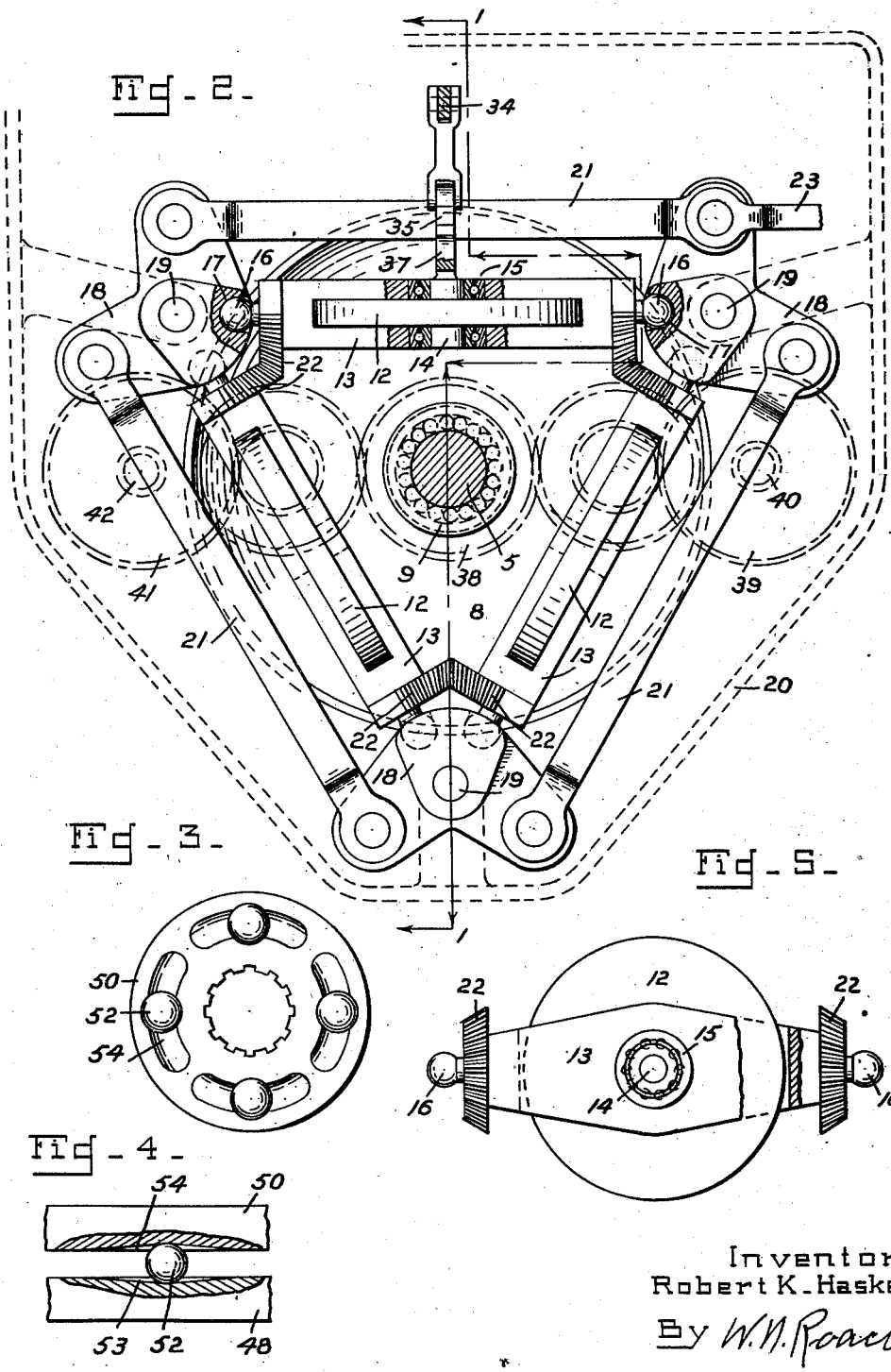
Inventor
Robert K. Haskell
By W. N. Roach
Attorney Aug. 16, 1938.   R. K. HASKELL   2,126,772
TRANSMISSION
Filed June 24, 1936   3 Sheets-Sheet 3
Fig-6-
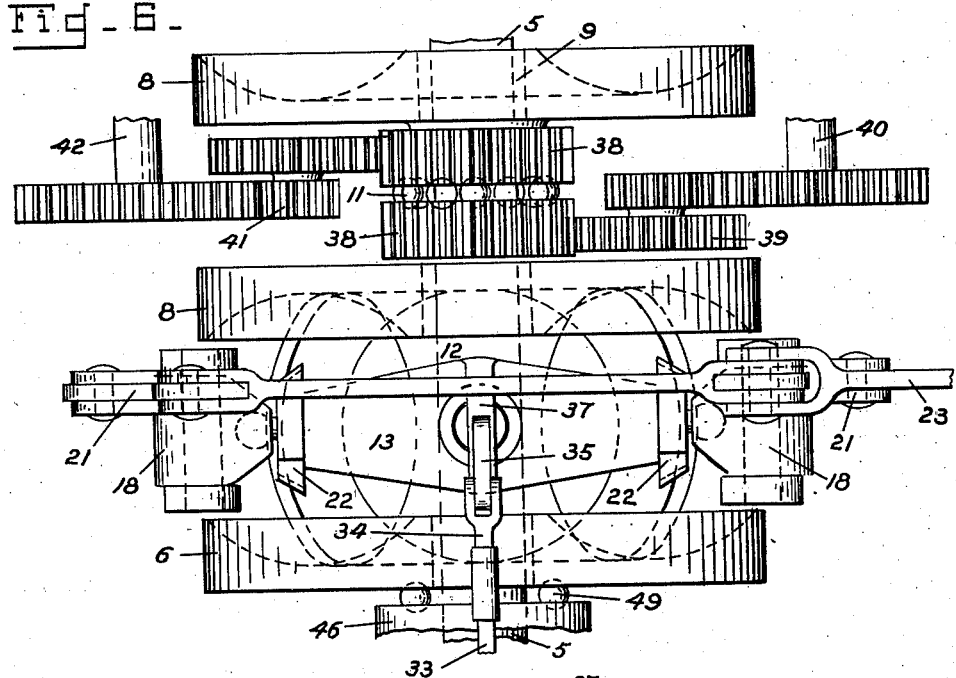
Fig-7-
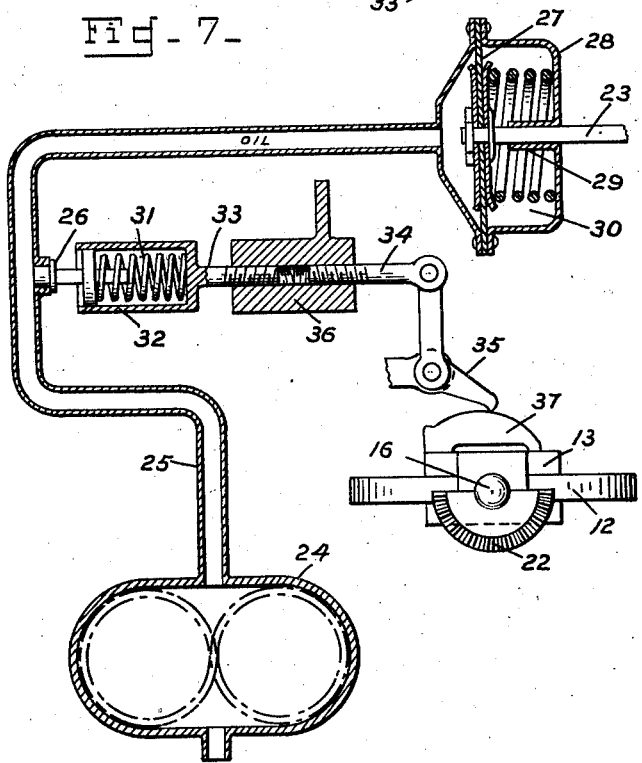
Inventor
Robert K. Haskell
By W. N. Roach
Attorney Patented Aug. 16, 1938

2,126,772

UNITED STATES PATENT OFFICE 2,126,772

TRANSMISSION

Robert K. Haskell, Berkeley, Calif.

Application June 24, 1936, Serial No. 87,018

6 Claims. (Cl. 74—190.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a transmission of the automatic continuously-variable type and is an improvement on the transmission shown in Patents Nos. 1,698,229 and 1,865,102.

In track-laying vehicles, steering is accomplished by driving the tracks at different speeds. The purpose of this invention is to provide a variable speed transmission of the friction type with two driven members and to arrange the friction units so that the transmission ratio may be independently as well as automatically controlled.

A further object is to provide an automatic ratio change with means whereby it is controlled by the rocking movement of the carriers in which the friction rollers are mounted.

Further objects are to provide novel means for insuring equal angular movement of the rockers and carriers and novel means for applying end thrust on the roller mechanism.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 2 is a sectional view on the line 2—2 of Fig. 1.

Fig. 3 is an end elevation of a clutch ring.

Fig. 4 is a view partly in plan and partly in section of an element of the clutch.

Fig. 5 is a plan view of a carrier.

Fig. 6 is a plan view of a part of the transmission.

Fig. 7 is a sectional view showing somewhat diagrammatically the control unit.

Figure 1:
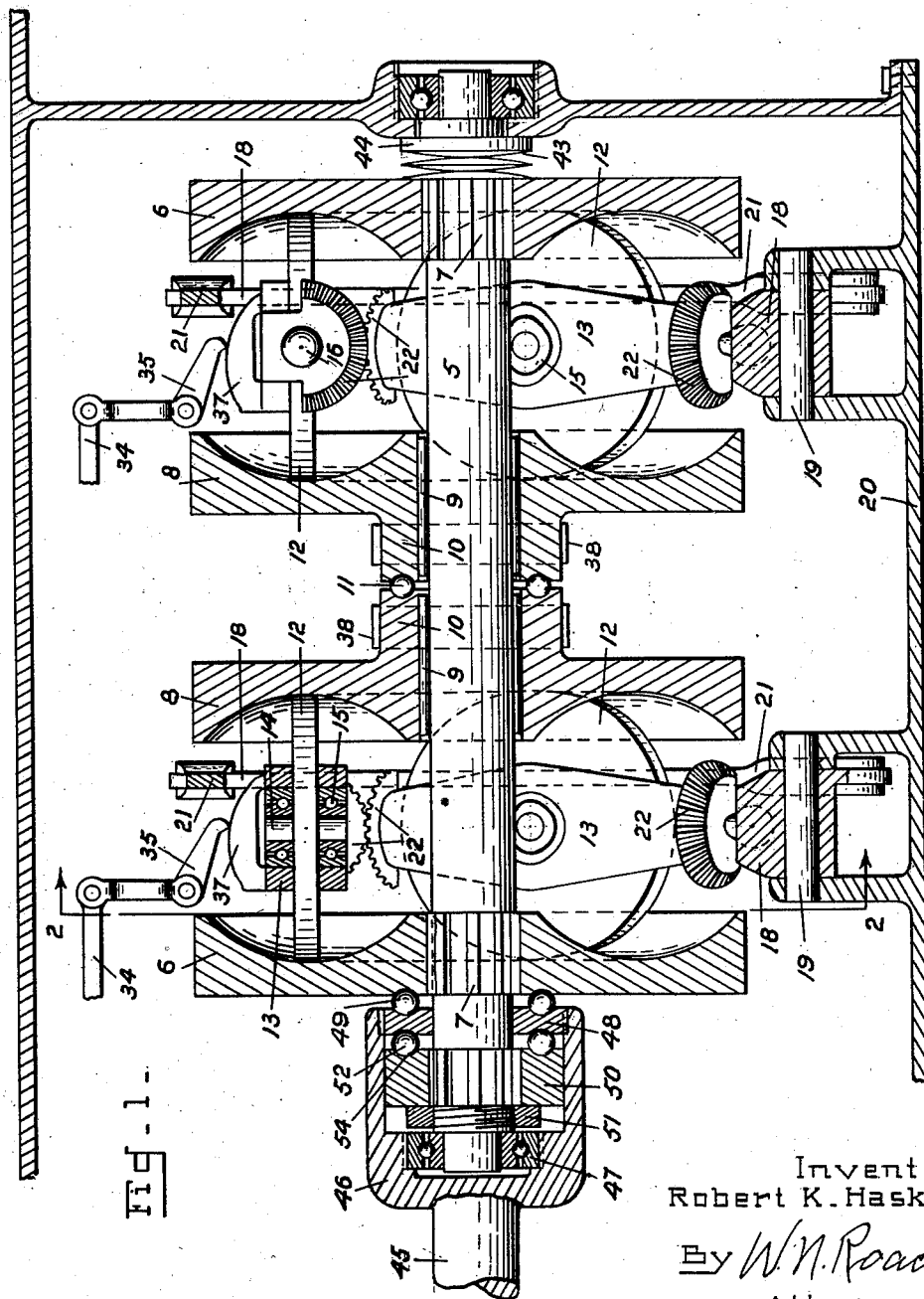
Fig. 1 is a longitudinal sectional view of the improved transmission taken on the line 1—1 of Fig. 2.

Referring to Fig. 1 there is shown a driving shaft 5 carrying two similar sets of disks having toroidal surfaces, the end disks 6—6 being splined to the shaft as at 7 and two center disks 8—8 being mounted on the shaft through anti-friction bearings 9—9. The center disks are formed with sleeves 10—10 which are separated by ball bearings 11.

A set of three rollers 12—12—12 are positioned between each set of disks and are arranged in spaced relation about the shaft 5 as seen in Fig. 2. Each roller is mounted in a carrier 13 and has its spindle 14 supported by an anti-friction bearing 15. Each carrier has ball ends 16—16 mounted in sockets 17 provided in rockers 18 which are each pivotally mounted on a pin 19 carried by a part of the fixed casing 20. There are three rockers 18 positioned 120 degrees apart and each rocker receives the ball ends of two carriers. The rocker pivots 19 are located at the intersection of the axes of adjacent carriers. The rockers are in the form of bell cranks and the arms are connected by links 21—21—21 which serve to maintain them in correlated positions. The carriers are provided adjacent their ball ends with bevel gear segments 22—22 which mesh with corresponding segments of adjacent carriers to insure simultaneous turning of the three carriers.

Since the rollers are carried by the fixed casing 20 and thereby held against angular displacement about the shaft 5, the rotation of the end disks will be transmitted through the rollers to the center disks which are thereby driven in opposite directions as clearly understood in the art. When the rollers are in normal position they engage the opposite disks on the same diameters the disks will rotate at the same speeds. If the rollers are tilted or precessed to engage the opposite disks on differing diameters a variation of speeds is secured.

In the normal position of equilibrium the axis of each roller represented by the spindle 14 intersects the disk axis 5. If the roller is shifted from its normal position, the frictional forces acting upon the roller will at once cause the roller and its carrier to rock or precess on the carrier axis so that the roller rolls of its own accord over a spiral path to bring its axis into intersection with the disk axis and thereby assumes a new position.

The shifting of the rollers of each group is accomplished by a rod 23 (Figs. 2 and 6) connected to an arm of one of the rockers 18, and because the rockers are connected by links 21 they will all be maintained in correlated positions. And similarly the rocking or precessing of the rollers will be simultaneous and equal because of the bevel gear segments connecting the carriers.

The rod 23 is associated with a hydraulic control unit (Fig. 7) comprising a pump 24 driven at engine speed and supplying oil under pressure through a line 25 to a valve 26 and to a diaphragm 27 which is connected to the rod 23. The diaphragm is mounted in a casing 28 which has a tubular guide 29 for the rod and encloses a spring 30 which opposes movement of the diaphragm under influence of the pressure fluid.

The valve 26 is mounted in the line 25 and is held in place by a spring 31 enclosed in a housing 32 which forms a seat for the spring. A rod 33 on the housing 32 and a rod 34 on a cam follower 35 are oppositely threaded in a nut 36. The cam follower rides on a cam 37 fixed at the center of one of the carriers 13.

When in equilibrium, the valve 26 maintains a constant hydrostatic pressure which just balances the spring 30 and maintains the diaphragm and the roller assemblies in the normal position. In order to produce a change in the transmission ratio the nut 36 is turned to increase or decrease the spring pressure on the valve 26. A change in the spring pressure on this valve causes a change in hydrostatic pressure which in turn produces motion in rod 23 and a tilting of the carriers 13. The rollers 12 then roll to their new position causing the carriers to rock and the cam 37 on one of the carriers moves the cam follower in the proper direction to overcome the change in spring pressure on the valve 26 and thereby reestablishes a condition of equilibrium with the rollers in their new positions. Any change in the position of the rollers 12 from equilibrium position controls the hydrostatic pressure in the correct direction to reestablish equilibrium through the action of the diaphragm 27 and rod 23.

The sleeves 10 of the center disks 8 carry similar gears 38—38 (Fig. 6) one of which is geared to a gear train 39 and driven shaft 40 on one side of the transmission unit and the other is geared to a gear train 41 and driven shaft 42 on the opposite side of the transmission unit.

In a track-laying vehicle the driven shafts 40 and 42 are employed to drive the right and left tracks. Since the center disks 8—8 are independently driven and independently controlled, the tracks may be operated at different speeds to provide steering of the vehicle.

The ability to transmit power is a function of the coefficient of friction between the disks and the rollers and the pressure between the contact surfaces. The pressure is obtained by a plurality of spring washers 43, (Fig. 1) confined between one end disk and a collar 44 on the shaft 5 and also by means of a loading device including a thrust clutch associated with the other end disk.

A clutch shaft 45 coaxial with the driving shaft 5 has a tubular end 46 receiving one end of the shaft 5 and supported thereon by an anti-friction bearing 47. The inner extremity of the tubular end is splined to a ring 48 floating on the shaft 5 and separated from the adjacent end disk 6 by balls 49. A ring 50 splined on the shaft 5 and backed by a nut 51 on the shaft is enclosed in the tubular end 46 and is separated from the ring 48 by balls 52. The opposing faces of the rings 48 and 50 are formed with grooves respectively 53 and 54, a set being provided for each of the balls 52. The floors of the grooves are inclined in opposite directions to the faces of the rings so that ramps are established to provide a wedging action of the balls.

In transmitting the drive from the shaft 45 to the shaft 5, the balls roll up the ramps thereby separating the rings 48 and 50. This separation continues until the resistance of separation equals the component of thrust caused by the torque exerted by clutch shaft 45. There is then no further relative rotation between rings 48 and 50 and the power is transmitted through the balls and ring 50 to shaft 5. The end thrust caused by this arrangement produces a pressure on the race and roller assembly which is proportional to the input torque.

I claim:

1. In a transmission mechanism, friction disks, friction rollers between the disks, carriers for the rollers mounted for speed-varying adjustment thereof, rockers for the carriers, a cam on one of the carriers, a pivoted cam follower engaging the cam, a rod connected to one of the rockers, a pressure-fluid line in which pressure is maintained proportional to engine speed, a diaphragm connected to the rod and subject to the pressure fluid, a spring opposing movement of the diaphragm, a valve subject to the pressure fluid, a valve spring acting through the valve and the pressure fluid to balance the diaphragm spring, a seat for the valve spring, a rod on the cam follower, and a nut in which the valve spring seat and the cam follower rod are oppositely threaded.

2. In a transmission mechanism, friction disks, one being engine-driven, rollers between the disks, carriers for the rollers, means for shifting the carriers to cause precession of the rollers, a pressure fluid control system in which pressure of the fluid is maintained proportional to engine speed, means whereby the pressure fluid imparts movement to the shifting means and carriers to initiate precession of the rollers, a control valve for establishing equilibrium in the pressure fluid to maintain the rollers in normal position, means whereby said control valve is actuated by movement of the carrier to establish equilibrium in the pressure fluid, and means for adjusting the control valve to vary the pressure of the fluid through the fluid and produce movement of the shifting means.

3. In a transmission mechanism, friction disks, one being engine-driven, rollers between the disks, carriers for the rollers, means for shifting the carriers to cause precession of the rollers, a pressure fluid control system in which pressure of the fluid is maintained proportional to engine speed, means whereby the pressure fluid imparts movement to the shifting means and carriers to initiate precession of the rollers, a control valve for establishing equilibrium in the pressure fluid to maintain the rollers in normal position, means whereby said control valve is actuated by movement of the carrier to establish equilibrium in the pressure fluid.

4. In a transmission, a driving shaft, a pair of driving disks fixed on the shaft for rotation in unison, a pair of driven disks mounted on the shaft for rotation independently of each other, friction rollers between the driving and the independently driven disks for driving the driven disks at variable speeds, a geared sleeve on each of the driven disks, and a driven shaft actuated by each geared sleeve.

5. In a transmission, a driving shaft, a pair of driving disks fixed on the shaft for rotation in unison, a pair of driven disks mounted on the shaft for rotation independently of each other, friction rollers between the driving and the independently driven disks for driving the driven disks at variable speeds, and a driven shaft actuated by each driven disk.

6. In a transmission mechanism, friction disks, one being engine-driven, rollers between the disks, carriers for the rollers, gear segments at the ends of each carrier and engaging the gear segments of adjacent carriers, rockers, each receiving the ends of adjacent carriers, links connecting the rockers, and means for shifting the rockers to cause precession of the rollers.

ROBERT K. HASKELL.